H. GIESSEL & C. A. SCHROYER.
APPARATUS FOR TREATING AND STORING WATER.
APPLICATION FILED FEB. 7, 1910.
1,065,442.
Patented June 24, 1913.
5 SHEETS—SHEET 1.
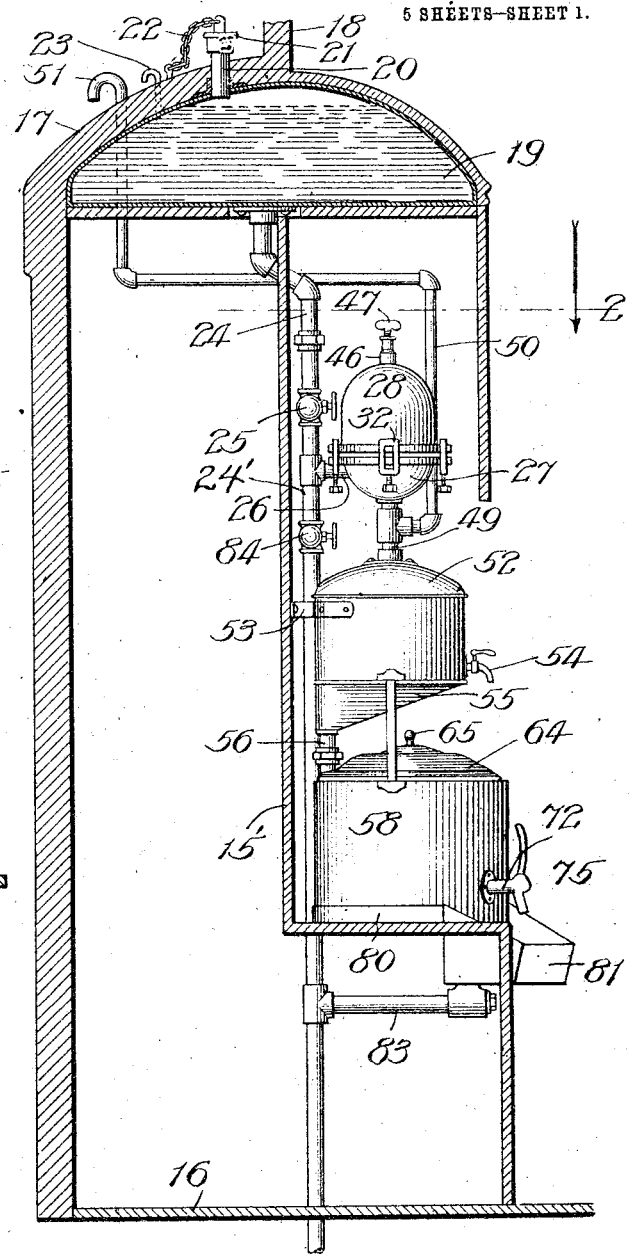
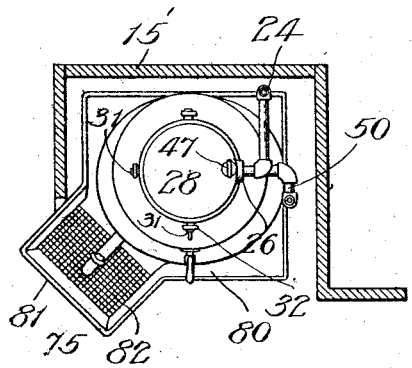
Witnesses:
C. E. Burnap
Henry A. Parks
Inventors
Henry Giessel &
Charles A. Schroyer
By Sherman, Wilkinson, Scott Richmond Attys.

H. GIESSEL & C. A. SCHROYER.
APPARATUS FOR TREATING AND STORING WATER.
APPLICATION FILED FEB. 7, 1910.
1,065,442.
Patented June 24, 1913.
5 SHEETS—SHEET 2.
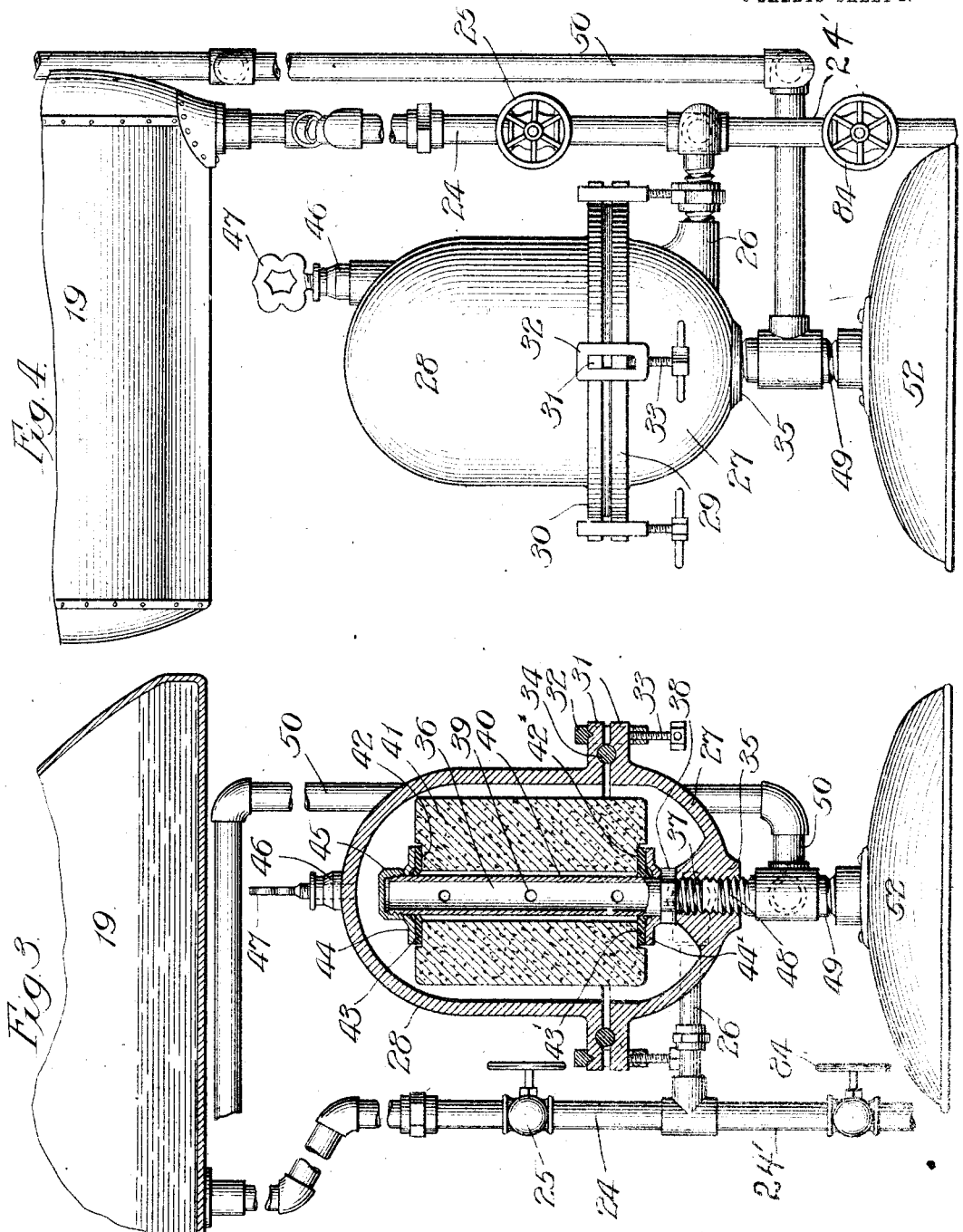

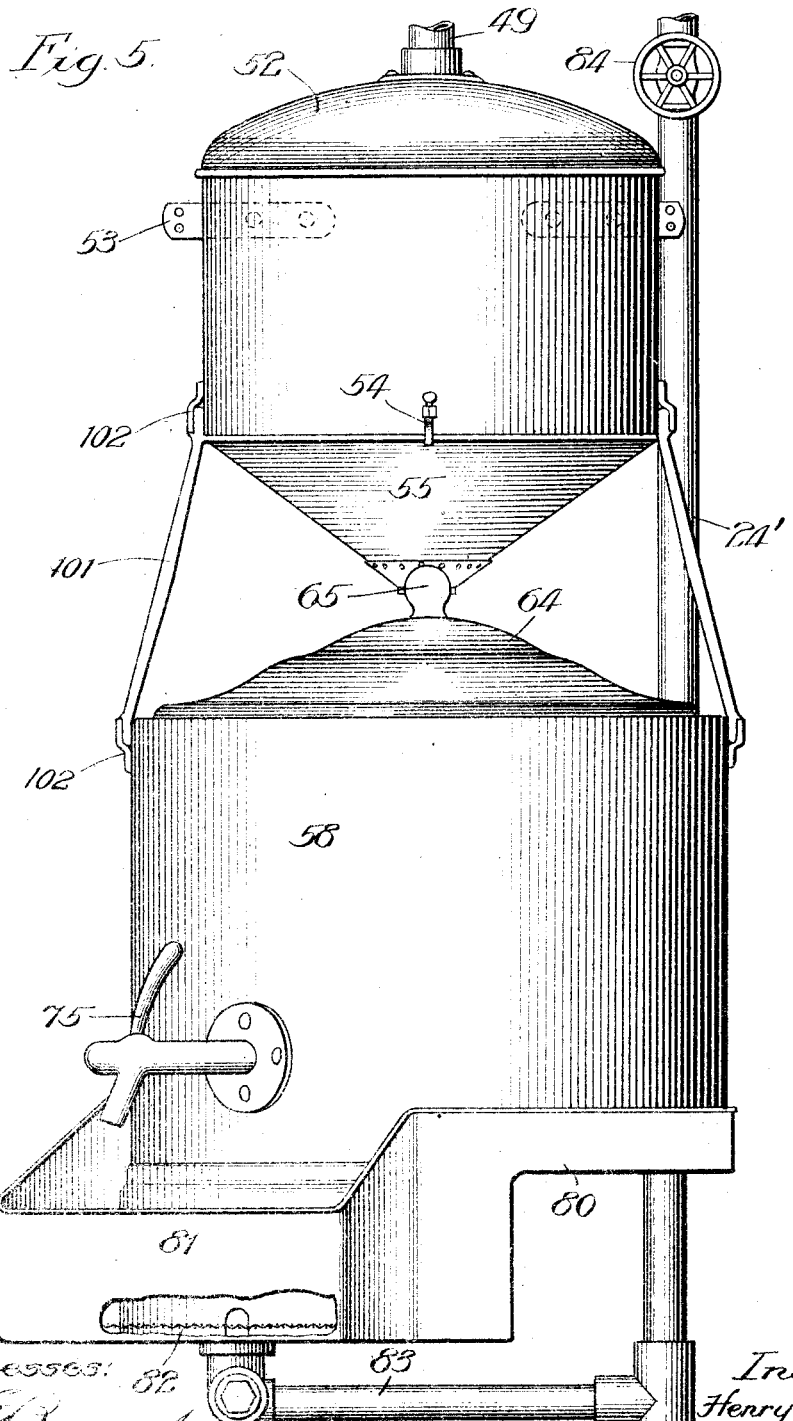

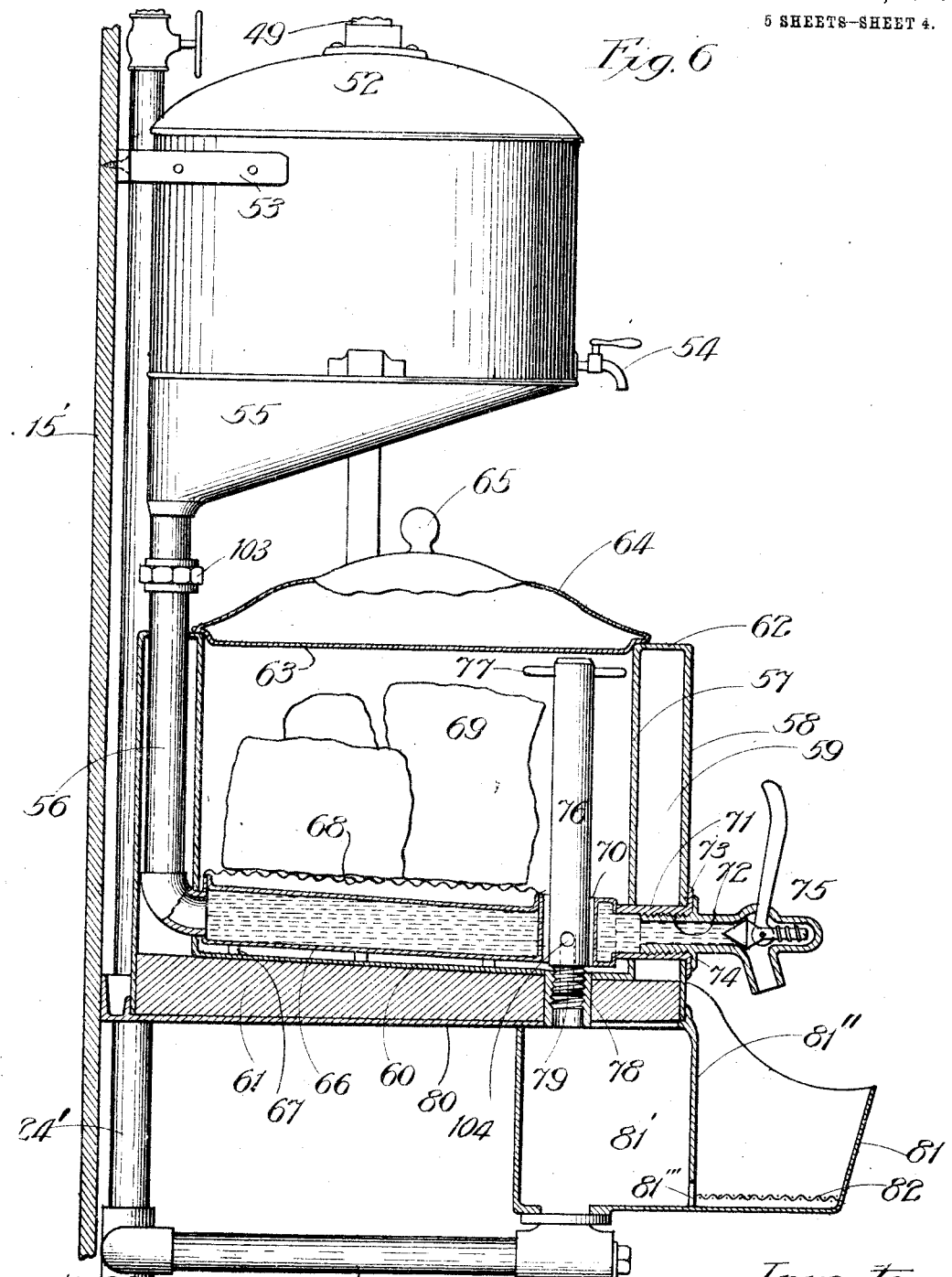

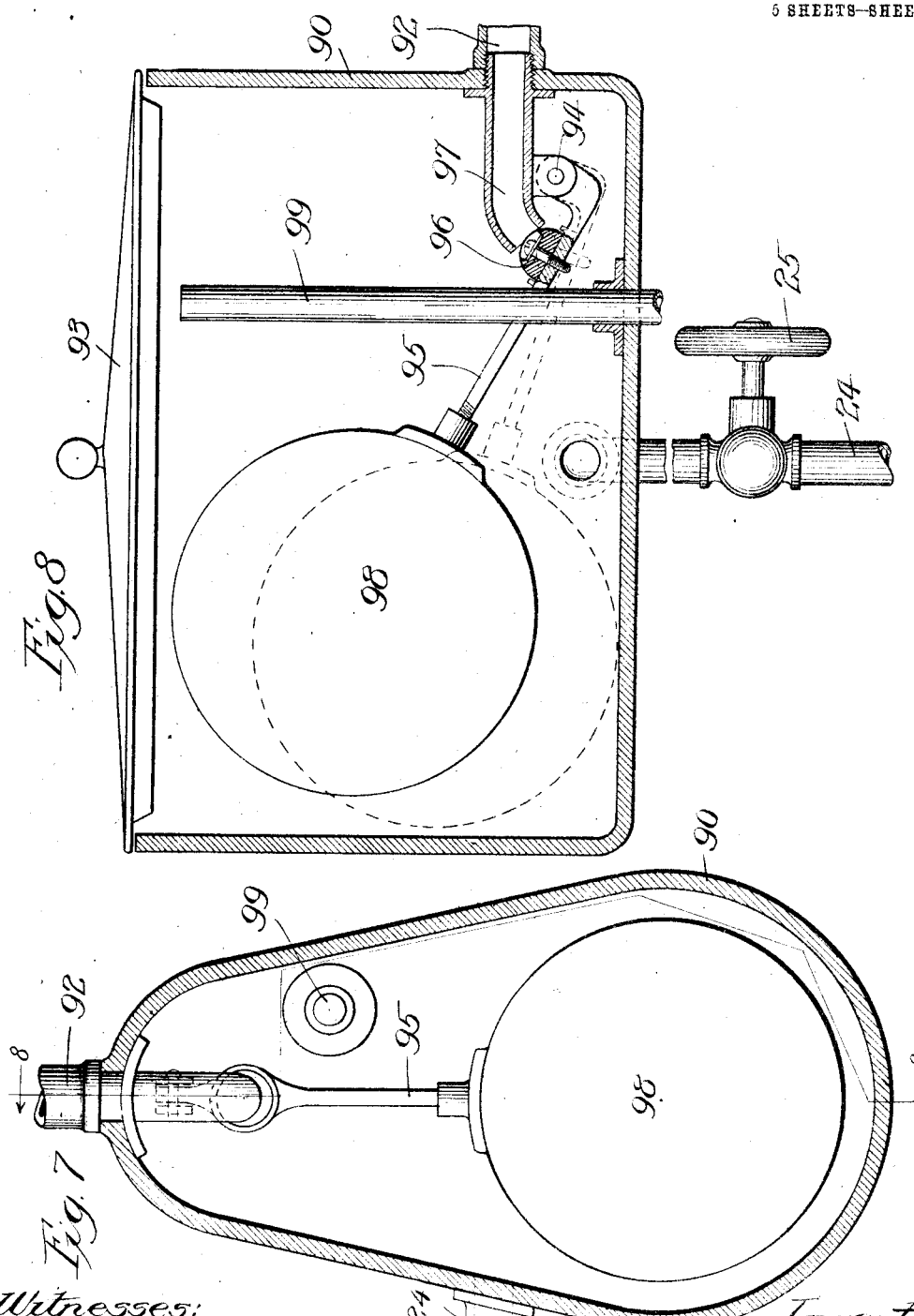

UNITED STATES PATENT OFFICE.

HENRY GIESSEL AND CHARLES A. SCHROYER, OF CHICAGO, ILLINOIS.

APPARATUS FOR TREATING AND STORING WATER.

1,065,442.     Specification of Letters Patent.     Patented June 24, 1913.

Application filed February 7, 1910. Serial No. 542,592.

*To all whom it may concern:*

Be it known that we, HENRY GIESSEL and CHARLES A. SCHROYER, citizens of the United States, residing at Chicago, in the county of Cook and State of Illinois, have invented certain new and useful Improvements in Apparatus for Treating and Storing Water, of which the following is a specification.

The principal object of our invention is to provide new and improved apparatus for treating water for drinking purposes and storing the same.

Another object of our invention is to provide such apparatus especially adapted to be installed on railway passenger coaches.

Another object is to provide such apparatus with means for readily cleaning, draining, or refilling the same.

Another object is to provide filtering apparatus that shall be easy to clean, simple in construction and efficient.

Another object is to provide suitable apparatus for cooling a portion of the water that is about to be drawn out for use.

These objects and various others will become readily apparent to those skilled in the art on reading the following specification and claims when taken in connection with the accompanying drawings. In these drawings we have shown one specific embodiment of our invention.

Figure 1 is a general elevation of the complete apparatus, the initial storage tank being shown in section. Fig. 2 is a horizontal section on the line 2, 2 of Fig. 1. Fig. 3 is an enlarged central vertical section of the filter. Fig. 4 is an elevation of the filter, looking in a direction at a right-angle to that from which Fig. 3 is taken. Fig. 5 is a front elevation of the secondary storage tank and the cooler. Fig. 6 is a side elevation of the secondary storage tank and cooler, the cooler being shown partly in section. Fig. 7 is a horizontal section of a water supply tank that may be used in connection with our system. Fig. 8 is a vertical section of the same.

In the particular embodiment of our invention which we have chosen to illustrate in the drawings, we have shown it as adapted to be installed in a railway passenger coach having the side wall 15, floor 16 and roof 17—18. The initial storage tank 19 is fitted closely under the roof 17 and has an inlet supply pipe 20 leading through the roof 17, and adapted to be closed on the outside by the cap 21 held by the chain 22. This tank 19 also has a vent pipe 23 leading through the roof 17 and hooked over on the outside so as to prevent the entrance of cinders or other objectionable matter.

A recess 15' (see Figs. 1 and 2) is provided in which the filtering, secondary storage, and cooling apparatus is installed. The pipe 24 controlled by the valve 25 leads downward from the initial storage tank 19, and thence by the portion designated 26 into the half-shell 27 having a boss 35 at its lower central part. This boss screws upon the delivery pipe 48 and thus the half-shell 27 is supported. The upper opposed half-shell 28 combines with the half-shell 27 to make a complete casing. The half-shells 27 and 28 are provided with respective flanges 29 and 30. Lugs 31 project out from these flanges at equally spaced intervals and are engaged in opposed pairs by the clamping rings 32, which coact with the clamping screws 33 to draw the flanges 29 and 30 tightly together upon the gasket 34.

A short length of pipe 36 has screw threads 37 at its lower end which screw into the boss 35, the collar 38 forming an abutment which rests against the boss 35. The pipe 36 has perforations 39 at intervals along its length and is surrounded by the filtering stone 41. This filtering stone is made of natural stone or tripoli block. It is supported in such a way as to leave an annular space 40 all around the pipe 36. At both ends this stone 41 is recessed or countersunk, as indicated by the reference numerals 42 and 42'. Within these countersinks are laid soft rubber gaskets 43 and 43', and these are overlaid by washers 44 and 44', each of these washers having its center cup-shaped so as to press upon the gasket only around its periphery. The cup-shaped washer 44' rests against the abutment 38, and the screw cap 45 over the end of the pipe 36 clamps the stone 41 tightly between the washers 44 and 44'. The recesses 42 and 42' in the ends of the stone 41 serve to center the stone on the pipe 36. A vent 46 is provided on top of the half-shell 28 and this is normally closed by a screw plug 47.

The annular space 40 within the stone 41 is directly connected through the perforations 39 with the interior of the pipe 36. This in turn connects through the boss 35 to the pipe 49 from which a branch pipe 50 leads up through the roof as a vent, the outer extremity 51 being turned over so as to prevent cinders and dirt from entering. The pipe 49 leads directly into the top of the secondary storage tank 52, which is supported by brackets 53 on the side wall 15'. A faucet 54 is provided by which uncooled but filtered water may be drawn from the tank 52 if so desired. The bottom of the tank 52 slopes downwardly and rearwardly to the discharge pipe 56.

A cooling chamber is provided beneath the secondary storage tank 52 having an inner round or oval cylindrical wall 57 and a corresponding outer cylindrical wall 58 with an air space 59 between them. The bottom of this cooling chamber is designated 60 on the drawing and is supported in a forwardly and downwardly sloping position by means of the wooden bottom 61. The air space 59 is closed above by the wall 62. The top cover 64 may be removed by means of the handle 65 when it is desired to put ice in the chamber.

Within the cooling chamber supported just above the bottom 60 thereof by means of the spacer blocks 67 is a shallow completely closed inner tank 66. The pipe 56 which leads from the secondary storage tank 52, passes down in the air space 59 and through the inner wall 57 into the inner cooling tank 66. On top of the cooling tank 66 is laid a sheet of corrugated metal 68 to support the ice 69. An opening 70 leads in a vertical direction through the tank 66 and the drain outlet nipple 78 in alinement with this opening 70 leads from the bottom 60 of the main cooling chamber. This drain outlet nipple 78 is closed by a screw plug 79 on the lower end of a long standard 76 which may be manipulated by means of a handle 77 at its upper end.

The pipe 71 leads through the double wall of the ice chamber, connecting with the cold water tank 66 at its inner end and terminating outside in the flange 73. The faucet 75 has screw threaded engagement at 72 with the pipe 71, the flange 74 abutting against the flange 73. The ice chamber stands in a tray 80 which has a depressed pocket 81 directly beneath the faucet 75. In the bottom of this pocket 81 is a grid 82 on which a glass or other receptacle may be placed to receive water from the faucet 75. Behind the pocket 81 is another pocket 81' directly below the drain nipple 78. The two pockets 81 and 81' are separated by a partition 81'' in which there is a hole 81''' to permit drainage from pocket 81 to pocket 81'. The conduit 24—26 has a descending branch 24' with a valve 84 therein. The drain pipe 83 leads from the bottom of the pocket 81' and connects with the pipe 24'. The standards 101 are adapted to have their ends slipped into the sockets 102 at the sides of the secondary storage tank 52 and the cooling chamber 58, thus assisting in supporting the tank 52 on the chamber 58. After the standards 101 are put in place, in assembling the device, the union 103 is drawn tight, thus tying the parts together. The standard 76 is made hollow at its lower part with an overflow conduit 104; thus when the plug 79 is closed the melted ice-water stands in the chamber 58 surrounding the cooling tank 66.

In normal operation the valve 25 is kept open and the valve 84 is closed. Water is introduced into the initial storage chamber 19 through the filling pipe 20, the air in the tank 19 escaping through the vent 23. This water flows from the tank 19 through the supply pipe 24—26 (the valve 25 being open) and discharges into the casing 27—28 around the stone 41. At starting the vent 46—47 is opened so as to let all the air escape from the casing 27—28 so that it will entirely fill with the water from the tank 19. The water within the casing 27—28 percolates through the stone 41 into the central annular space 40, leaving the suspended impurities on the outside surface of the stone. Thence the water flows through the perforations 39 into the pipe 36 and down through the pipe 49 into the secondary storage tank 52 and thence into the cooling tank 66. Any air that may be initially contained in the tanks 52 or 66 will escape by means of the pipe 50—51. The water in the cooling tank 66 will be cooled by the ice 69, but of course will not be contaminated by any impurities in the ice 69. Cold water can be drawn off by means of the faucet 75. Uncooled water for domestic use, surgical purposes, etc., can be drawn off from the faucet 54. Whenever water is drawn off through one of these two faucets the water level will fall in the pipe 50 and tank 52, the vacant space filling with air entering through the "goose-neck" 51. But the water will filter slowly through the stone 41 and will bring this water level up again. The tray pocket 81 drains through the opening 81''' into pocket 81'. Both pockets 81 and 81' drain through pipe 83. The water formed by the melting of the ice 69 is drained off from the ice chamber by unscrewing the plug 76 by means of the handle 77.

When it is desired to clean the filter stone 41 this may be done by closing the valve 25 and opening the valve 84 and vent 46—47; thus water from the tank 19 will be prevented from entering the casing and the water contained in the casing will be drained out through the valve 84. Next the clamps 32—33 may be unscrewed and the upper half-shell 28 removed, thus giving access to the stone 41. The upper half-shell 28 is purposely made larger than the lower half-shell 27 in order to give complete access to the stone 41. Furthermore, the stone 41 can be removed by unscrewing the joint 37—35, and then it can be removed to any convenient place to be cleaned or sterilized. It will be observed that the opening into pipe 26 from casing 27—28 is below the top of boss 35, so that any water in the casing will not drain into pipe 49 when the stone 41 is removed, but will drain out through pipe 26. After the stone 41 has been cleaned and the casing reassembled by means of the clamps 32—33, the valve 84 may be closed and the valve 25 opened, the vent 46—47 being left open until the casing 27—28 fills with water.

When it is desired to completely drain the entire outfit, as for example when the car is to stand unheated in the yards in winter, this may be accomplished by opening the valves 25, 84 and 75, the vent 46—47 and the drain plug 79. The two rubber gaskets 43 and 43' are made with their holes somewhat smaller than the outside boundary of the pipe 36 which they are intended to surround. Thus when they are pushed upon this pipe, their inner edges are deflected a little to one side of the general plane of each gasket, and embrace the pipe tightly. The cup shape that is given to the washers 44 and 44' accommodates the deflected portion of the gaskets just referred to. If desired the tank 19 may be omitted and the pipe 24 connected to any other source of supply. For example if the apparatus is to be used in a stationary location the pipe 24 may be connected to the city water main.

In case the city water main were connected directly to the pipe 24, this would put the filter under the full pressure of the main, and the pipe 50 would have to extend up to a very great height. In such cases, therefore, it may be desirable to interpose the apparatus shown in Figs. 7 and 8. 90 is a small tank which may be secured to the wall by suitable means. The city water main is connected to the inlet pipe 92 and the tank has a removable cover 93. The arm 95 is pivoted at 94 and carries a rubber valve member 96 which coacts with the end 97 of the pipe 92. The arm 95 carries a float 98 at its end. The overflow pipe 99 is intended to connect with the pipe 24 at a point below the valve 84. In case this auxiliary tank is used its outlet will be connected to the pipe 24 above the valve 25. When this auxiliary device shown in Figs. 7 and 8 is used, the city water under pressure will flow in through the pipe 92 until it fills the tank 90 to a level sufficient to raise the float 98 to close the valve 96—97. Thus there will always be water under a moderate head to flow into the pipe 24 and supply the filter. If by any possibility the valve 96—97 should leak, the tank will overflow through the pipe 99, and the overflow will not do any harm.

It will be observed that the device is especially adapted to save labor when used on railway passenger coaches. The only attention needed *en route* will be to keep the tank 19 filled through the inlet pipe 20 and to keep ice in the ice chamber. When the car is being overhauled and cleaned the filter can also be cleaned. The design of the tank 52 with its bottom sloping downwardly and rearwardly as indicated by the reference numeral 55 is such as to facilitate introducing the ice into the ice chamber.

We claim:

1. In combination, a passenger coach, a water tank fitted closely under the roof thereof, a filling pipe and a vent pipe leading through the roof from said tank, a filter below the tank, a storage tank below the filter, a conduit leading from the water tank to the filter, another conduit leading from the filter to the storage tank, a surface cooler below the storage tank, a conduit leading through the surface cooler from the storage tank, and a faucet terminating said conduit.
2. In combination, a filtering chamber, a filtering stone therein, a water supply conduit leading to the chamber, a discharge conduit leading therefrom, a storage tank beneath the filtering chamber connected to said discharge conduit, an ice chamber below the storage chamber, a cold water tank within the ice chamber, a conduit leading from the storage tank to the cold water tank, a discharge conduit leading from the cold water tank, a drainage pipe from the said ice chamber, a branch pipe connecting the said water supply conduit to the said drainage pipe, and a valve in said branch connection.

3. In a device of the class described, a support, an ice chamber standing thereon, a side wall adjacent to said chamber, a storage chamber above the ice chamber supported by brackets on said side wall, the bottom of said chamber sloping downwardly toward said wall, a cooling tank within the ice chamber, a conduit leading from the lowest point of said storage chamber through the side walls of the ice chamber to the cooling tank, a discharge conduit leading through the side walls from the cooling tank, a filtering chamber above the storage chamber, an inlet supply conduit to the filtering chamber, an outlet supply pipe directly from the filtering chamber to the storage chamber, said last named pipe serving to support the filtering chamber upon the storage chamber, a valved branch conduit from said inlet supply conduit, and a drainage pipe from said ice chamber.

4. In combination, a passenger coach, a water tank fitted closely under the roof thereof, a filter directly below said tank, a storage tank directly below the filter, a conduit leading from the first named water tank into the filter, another conduit leading from the filter to the storage tank, a surface cooler directly below the storage tank, a conduit leading through the surface cooler from the storage tank, and a faucet terminating said conduit.

5. In a device of the class described, an initial storage tank, a pipe leading downwardly therefrom, a valve in said pipe, a filter casing connected to said pipe, a depending branch pipe connected to said first mentioned pipe at a point below the valve therein, a second valve in said branch pipe, a storage tank below the filter casing, a pipe connecting the filter casing to the last mentioned storage tank, and a branch vent pipe from said last named pipe extending up and having an open end terminating above the top of the initial storage tank.

6. In a device of the class described, a source of water supply, a water supply pipe extending downwardly therefrom, a valve in said pipe, a filter casing connected to said pipe at its lower end, a depending branch pipe from said supply pipe connected therewith at a point below the valve therein, a second valve in said branch pipe, a storage tank to receive water from the filter casing and located below the same, a pipe joining the filter casing to the storage tank, a branch vent pipe therefrom extending up beside the filter casing, a surface cooler below said storage tank, a drainage pipe from said cooler, and a branch pipe from said water supply pipe connected therewith at a point below the valve in the said water supply pipe, said branch pipe and said drainage pipe being connected together to a common outlet and said branch pipe having a valve therein.

7. In a device of the class described, a filter casing, a storage tank below the same, a pipe connecting them, a double walled ice chamber below the storage tank, a pipe from the storage tank passing down between the inner and outer thicknesses of the double wall of the ice chamber and branching through the inner thickness into the ice chamber, a water chamber connected to said pipe within the ice chamber, a faucet projecting from the water chamber out through the double wall, a supply pipe leading downwardly by the side of the filter casing and connected to the lower part thereof, a valved branch from said supply pipe extending downwardly, and a drainage pipe from the said ice chamber connecting therewith.

8. In a device of the class described, a source of water supply, a vertical pipe connected at its upper end to said source of water supply, a lateral extension from the lower end of said pipe, a valve in said pipe, a filter casing connected to said lateral extension, a depending branch from said vertical pipe connected therewith at a point below the valve therein, a second valve in said depending branch, an ice chamber below the filter casing, a conduit leading from the filter casing through the ice chamber, and a drain pipe from the ice chamber connecting with the said branch pipe.

9. In a device of the class described, a passenger coach, a water supply tank fitting closely under the roof thereof, a pipe leading downwardly therefrom, a filter casing connected to said pipe, a discharge pipe leading down from the filter casing, a vent pipe branching from said discharge pipe and extending up through the roof of the passenger coach, and a goose neck terminating said vent pipe.

10. In a device of the class described, a filter casing, a storage tank to receive water therefrom located directly below said casing, an ice chamber directly below the storage tank, said filter casing being connected by a pipe to the storage tank, said pipe supporting the filter casing upon the storage tank, downwardly opening sockets on the lower external edge of the said storage tank, opposed upwardly opening sockets on the upper external edge of the said ice chamber, and struts fitting in said sockets and thereby supporting the said storage chamber upon the said ice chamber.

11. In combination, a passenger coach, a water tank fitted closely under the roof thereof, a filling pipe and a vent pipe leading through the roof from said tank, a filter below the tank, a storage tank below the filter, a conduit leading from the water tank to the filter, another conduit leading from the filter to the storage tank, a surface cooler below the storage tank, a conduit leading through the surface cooler from the storage tank, a faucet terminating said conduit, and vertical struts supporting the said storage tank upon the said surface cooler.

12. In combination, a passenger coach, a water tank fitted closely under the roof thereof, a filling pipe and a vent pipe leading through the roof from said tank, a filter below the tank, a storage tank below the filter, a conduit leading from the water tank to the filter, another conduit leading from the filter to the storage tank, a surface cooler below the storage tank, a conduit leading through the surface cooler from the storage tank, a faucet terminating said conduit, and a valved drainage branch leading downwardly from said conduit from the water tank before it enters the said filter.

In testimony whereof, we have subscribed our names.

HENRY GIESSEL.
CHARLES A. SCHROYER.

Witnesses to the signature of Henry Giessel:
CARL A. RICHMOND,
FLORENCE A. FLORELL.

Witnesses to the signature of Charles A. Schroyer:
JOHN C. STEVENSON,
FRED. G. CHAPLIN.